United States Patent
Abe

(10) Patent No.: US 10,759,315 B2
(45) Date of Patent: Sep. 1, 2020

(54) VEHICLE SEAT

(71) Applicant: Tachi-S Co., Ltd., Tokyo (JP)

(72) Inventor: Hitoshi Abe, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 16/292,970

(22) Filed: Mar. 5, 2019

(65) Prior Publication Data

US 2019/0308535 A1 Oct. 10, 2019

(30) Foreign Application Priority Data

Apr. 9, 2018 (JP) ................................. 2018-074598

(51) Int. Cl.
*B60N 2/64* (2006.01)
*B68G 7/05* (2006.01)
*B60N 2/58* (2006.01)

(52) U.S. Cl.
CPC ........... *B60N 2/643* (2013.01); *B60N 2/5891* (2013.01); *B68G 7/05* (2013.01)

(58) Field of Classification Search
CPC .... B60N 2/643; B60N 2/5891; B60N 2/5816; B60N 2/5883; B68G 7/05; B68G 7/052
USPC ..................................................... 297/284.1
See application file for complete search history.

(56) References Cited

U.S. PATENT DOCUMENTS

| | | | | |
|---|---|---|---|---|
| 2,565,870 A | * | 8/1951 | McGuire | A47C 5/06 297/295 |
| 4,844,539 A | * | 7/1989 | Selbert | A47C 31/11 297/228.13 |
| 2002/0050734 A1 | * | 5/2002 | Takezawa | B60N 2/5825 297/452.58 |
| 2010/0295282 A1 | * | 11/2010 | Kim | B60N 2/58 280/730.2 |
| 2016/0317047 A1 | * | 11/2016 | Sugiyama | A61B 5/6893 |
| 2019/0009698 A1 | * | 1/2019 | Ohtsu | B60N 2/5891 |
| 2019/0009699 A1 | * | 1/2019 | Ohtsu | B60N 2/5883 |
| 2019/0143860 A1 | * | 5/2019 | Ohtsu | B60N 2/5883 297/452.58 |

FOREIGN PATENT DOCUMENTS

JP 2005-013621 A 1/2005

* cited by examiner

*Primary Examiner* — Mark R Wendell
(74) *Attorney, Agent, or Firm* — Morgan, Lewis & Bockius LLP

(57) ABSTRACT

A vehicle seat is provided which includes a protruding corner formed by joining a first surface and a second surface. The protruding corner includes a pad, a surface cover covering a surface of the pad, and a contour defining plate that is provided on a back side of the surface cover at a position corresponding to the second surface of the protruding corner, the contour defining plate defining the contour of the protruding corner. The contour defining plate has a first edge arranged along a top portion of the protruding corner and a second edge different from the first edge, the contour defining plate not being fixed to the surface cover at the first edge, but fixed to the surface cover at the second edge.

3 Claims, 10 Drawing Sheets

VEHICLE SEAT

CROSS-REFERENCE TO RELATED APPLICATION

This application relates to and claims priority from Japanese Patent Application No. 2018-074598, filed on Apr. 9, 2018, the entire disclosure of which is incorporated herein by reference.

BACKGROUND

Field

The present invention relates to a vehicle seat.

Description of Related Art

Some vehicle seats have a three-dimensional shape with a protruding corner from a design and functional viewpoint (see JP2005-013621 A). Such three-dimensional shape of a vehicle seat is achieved by molding a pad into a desired three-dimensional shape and attaching a surface cover onto the pad.

However, in the above-mentioned vehicle seat, the protruding corner of the pad may be crushed by the surface cover during the attachment of the surface cover, which makes it difficult to achieve a desired, well-defined three-dimensional shape.

SUMMARY

The present invention has been made in light of the above-mentioned problem and an object of the present invention is to provide a vehicle seat capable of achieving a desired three-dimensional shape having a protruding corner.

A vehicle seat according to an aspect of the invention includes a protruding corner formed by joining a first surface and a second surface, the protruding corner including: a pad; a surface cover covering a surface of the pad; and a contour defining plate that is provided on a back side of the surface cover at a position corresponding to the second surface of the protruding corner, the contour defining plate defining a contour of the protruding corner, in which the contour defining plate has a first edge arranged along a top portion of the protruding corner and a second edge different from the first edge, the contour defining plate not being fixed to the surface cover at the first edge, but fixed to the surface cover at the second edge.

According to the above aspect of the invention, the contour defining plate is provided on the back side of the surface cover at a position corresponding to the second surface of the protruding corner, and the contour defining plate is not fixed to the surface cover at the first edge arranged along the top portion of the protruding corner, but is instead fixed to the surface cover at the second edge different from the first edge. With such configuration, the contour defining plate can form a well-defined protruding corner at the top portion of the protruding corner without being affected by the pad and the surface cover, which results in the achievement of a desired three-dimensional shape.

The second edge of the contour defining plate may be located apart from the top portion of the protruding corner and located on an opposite side of the first edge.

The vehicle may further include a recessed corner formed by joining the second surface and a third surface, the second edge of the contour defining plate being arranged along a bottom portion of the recessed corner and fixed to the surface cover at the bottom portion of the recessed corner.

The contour defining plate may be made of resin and fixed by sewing to the surface cover.

The protruding corner may be provided on a lateral surface of a backrest of the vehicle seat.

DETAILED DESCRIPTION

Figure 1:
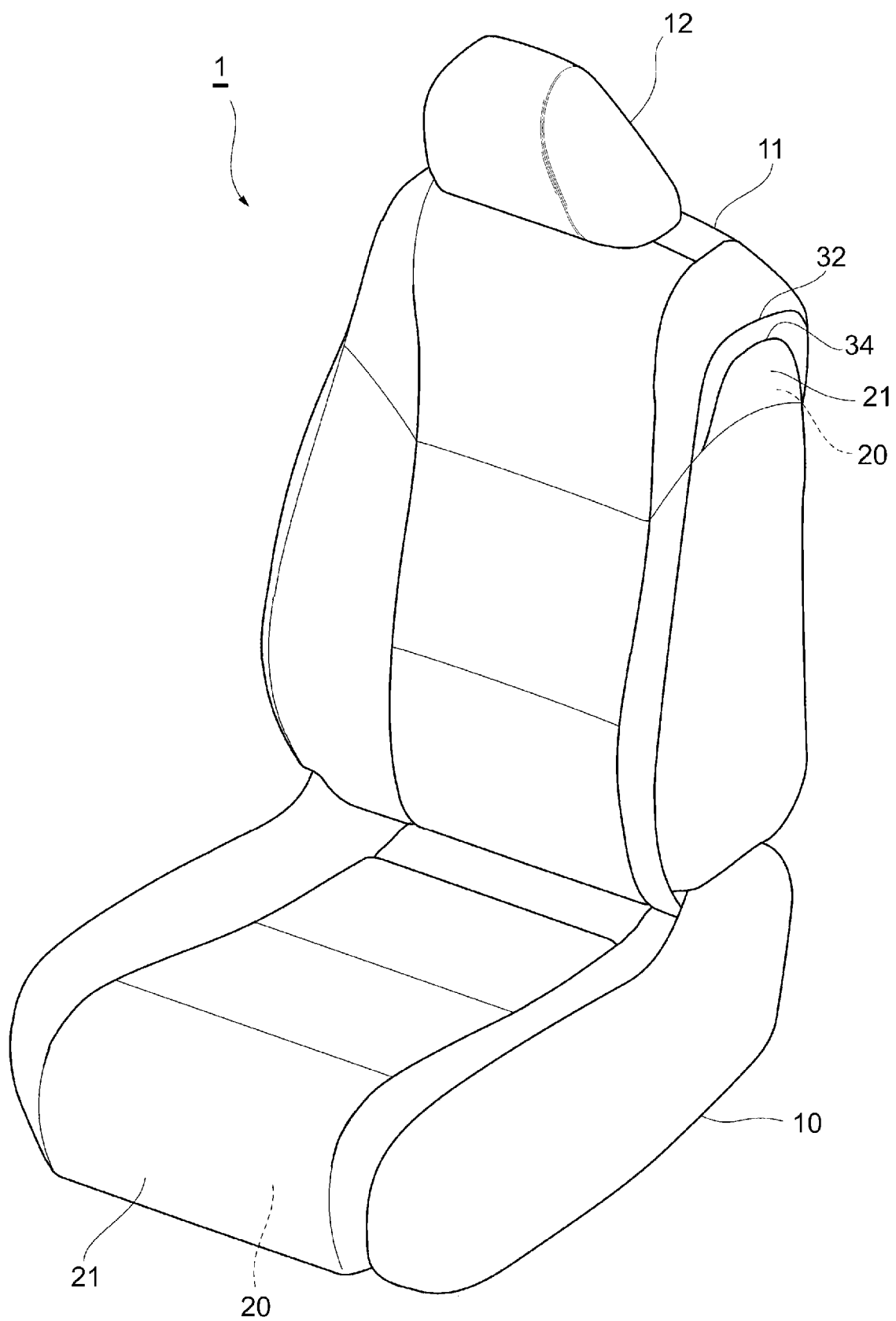
FIG. 1 is a perspective view showing an example of a configuration of a vehicle seat.

Preferred embodiments of the invention will be described below with reference to the attached drawings. Like reference numerals denote similar components and redundant explanations thereof will be omitted. Positional relationships such as upper, lower, right and left are based on the positional relationships shown in the drawings, unless otherwise indicated. The dimensional ratios in the drawings are not limited to those shown in the drawings. The following embodiments are examples for explaining the present invention and the present invention is not limited to such embodiments.

FIG. 1 is a perspective view showing an example of a configuration of a vehicle seat 1 according to an embodiment of the invention. For example, the vehicle seat 1 may include a seat part 10 on which a person sits, a backrest 11 against which the person leans on his/her back, a headrest 12, etc.

The seat part 10, the backrest 11 and the headrest 12 have a pad 20 provided therein and a surface cover 21 provided on a surface of the pad 20. The pad 20 may be formed of, for example, resin foam or the like and the surface cover 21 may be formed of fabric, leather or the like.

Figure 2:
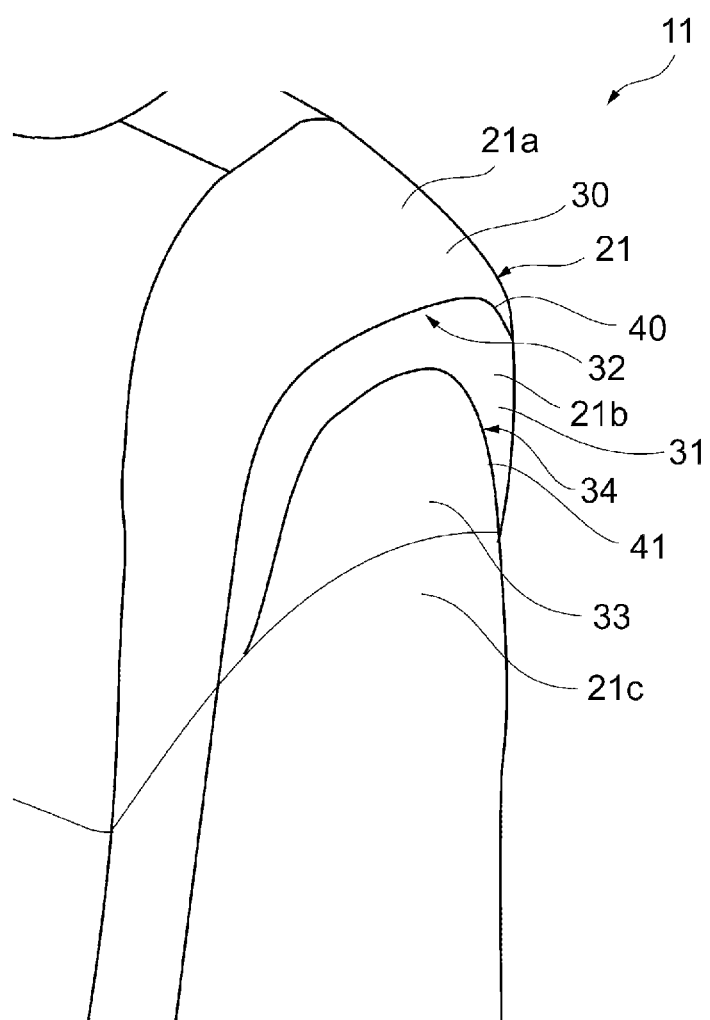
FIG. 2 is an enlarged view of an upper portion in a lateral surface of a backrest.
Figure 3:
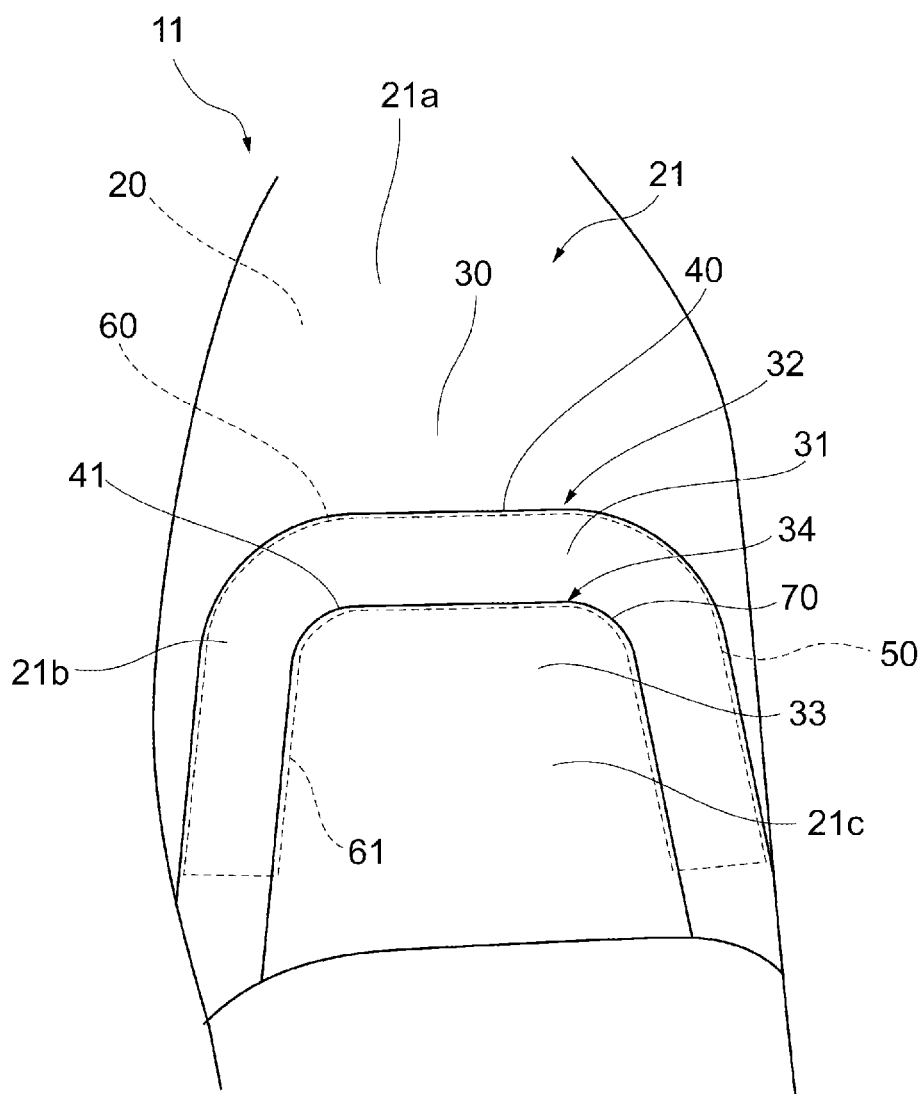
FIG. 3 is a plan view of the upper portion in the lateral surface of the backrest.

The vehicle seat 1 includes one or more protruding corners that protrude outward. For example, the backrest 11 includes a protruding corner 32 formed by joining a first surface 30 and a second surface 31, as shown in FIGS. 2 and 3. Further, the backrest 11 includes a recessed corner 34 formed by joining the second surface 31 and a third surface 33. The protruding corner 32 and the recessed corner 34 are formed continuously. Each interior angle of the protruding corner 32 and the recessed corner 34 is only required to be greater than 0 degrees and less than 180 degrees, and may be, for example, 120 degrees or more or 90 degrees or less.

The shapes of the protruding corner 32 and the recessed corner 34 are not particularly limited; for example, the protruding corner 32 may have a slightly curved top portion and the recessed corner 34 may have a small groove in a bottom portion thereof.

As shown in FIG. 3, for example, a top portion 40 formed at a joint between the first surface 30 and the second surface 31 may be curved upward as viewed from a lateral side of the backrest 11. A bottom portion 41 formed at a joint between the second surface 31 and the third surface 33 may be curved upward. The bottom portion 41 is provided on the inner side of the top portion 40 and the top portion 40 and the bottom portion 41 form double arcs.

Figure 4:
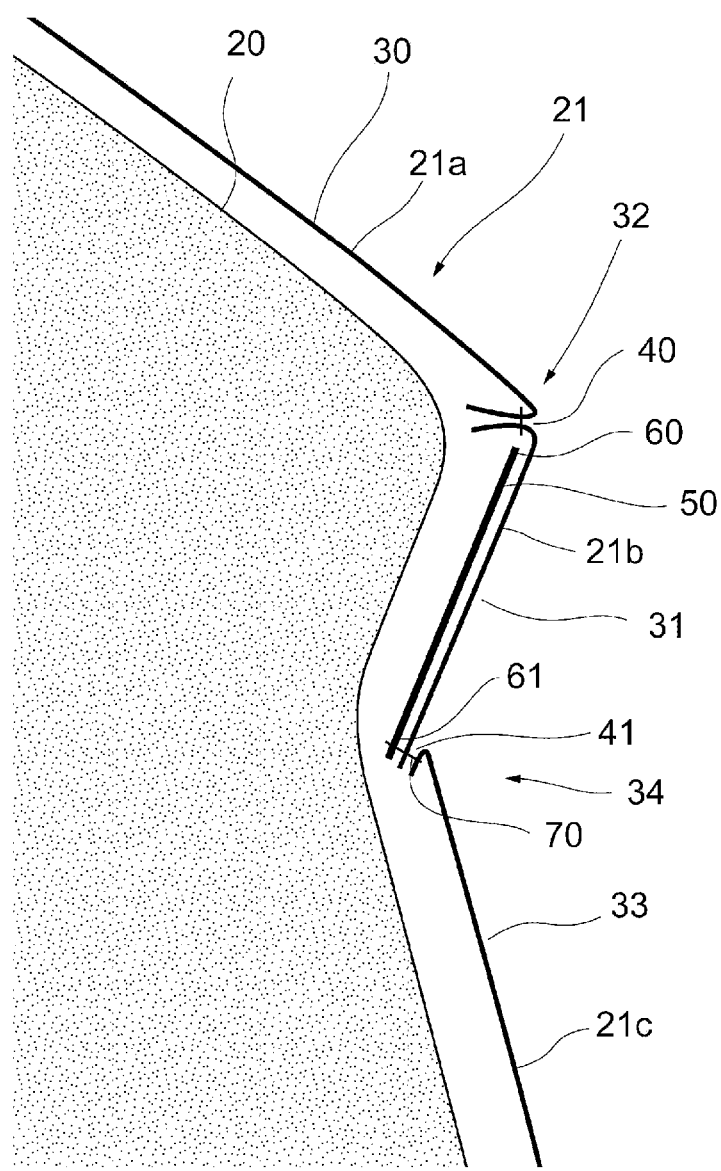
FIG. 4 is a schematic diagram showing a cross-sectional structure of the backrest.

As shown in FIGS. 2 to 4, the surface cover 21 is formed by sewing cover pieces together, wherein the first surface 30, the second surface 31 and the third surface 33 correspond to a cover piece 21a, a cover piece 21b and a cover piece 21c, respectively. The cover piece 21a and the cover piece 21b are sewn together at the top portion 40 and the cover piece 21b and the cover piece 21c are sewn together at the bottom portion 41.

As shown in FIGS. 3 and 4, the protruding corner 32 has, on a back side of the surface cover 21, a contour defining plate 50 that defines the contour of the protruding corner 32. The contour defining plate 50 is provided on the back side of the surface cover 21 at a position corresponding to the second surface 31 of the protruding corner 32 (i.e., the back side of the cover piece 21b).

The contour defining plate 50 may be made of, for example, a rigid resin. The material of the contour defining plate 50 is not particularly limited, as long as it is more rigid than the surface cover 21, and examples of the material may include felt, fabrics and metals. The contour defining plate 50 has a wide and curved shape along the second surface 31.

The contour defining plate 50 has an upper, first edge 60 arranged along the top portion 40 of the protruding corner 32 and a lower, second edge 61 arranged along the bottom portion 41 of the recessed corner 34. The contour defining plate 50 is sewn with the surface cover 21 at the second edge 61, i.e., in the vicinity of the bottom portion 41 of the recessed corner 34 which is located apart from the top portion 40 of the protruding corner 32 and on the opposite side of the first edge 60. A sewing line 70 is curved upward along the bottom portion 41. The contour defining plate 50, the cover piece 21b and the cover piece 21c are sewn together. The contour defining plate 50 has a free end which is not fixed to the surface cover 21 at the first edge 60 on the side of the top portion 40 of the protruding corner 32.

In the present embodiment, the contour defining plate 50 is provided on the back side of the surface cover 21 at a position corresponding to the second surface 31 in the protruding corner 32 and the contour defining plate 50 is not fixed at the first edge 60 located along the top portion 40 of the protruding corner 32, but is instead fixed to the surface cover 21 at the second edge 61 located on the opposite side of the first edge 60. The contour defining plate 50 can define the contour of the protruding corner 32 in the vicinity of the top portion 40 of the protruding corner 32 without being affected by the pad 20 and the surface cover 21. With such configuration, it is possible to form a well-defined protruding corner 32 in the vehicle seat 1, which results in the achievement of the vehicle seat 1 having a desired three-dimensional shape.

Since the second edge 61 of the contour defining plate 50 is located on the opposite side of the first edge 60, which is located apart from the top portion 40 of the protruding corner 32, the first edge 60 side in the contour defining plate 50 is not restrained, which allows the shape of the protruding corner 32 to be properly defined.

The vehicle seat 1 further includes the recessed corner 34 formed by joining the second surface 31 and the third surface 33, and the second edge 61 of the contour defining plate 50 is arranged along the bottom portion 41 of the recessed corner 34 and fixed to the surface cover 21 at the bottom portion 41 of the recessed corner 34. With such configuration, it is possible to achieve a desired three-dimensional shape having the protruding corner 32 and the recessed corner 34.

Since the contour defining plate 50 is made of resin and fixed by sewing to the surface cover 21, the contour defining plate 50 can be properly fixed.

Although an example in which the protruding corner 32 is provided on the lateral surface of the backrest 11 of the vehicle seat 1 has been described in the above embodiment, the protruding corner may be provided in any other parts in the vehicle seat.

Figure 5:
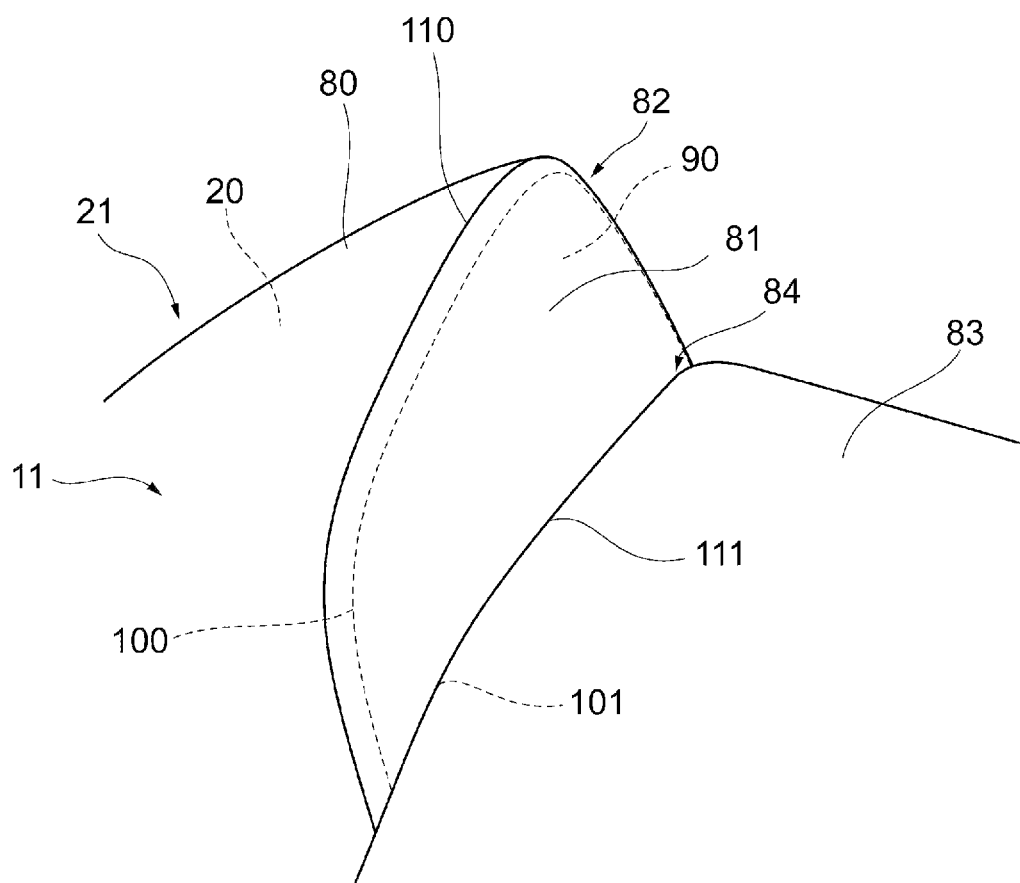
FIG. 5 is an illustration showing an overhanging portion in a shoulder part of the backrest.
Figure 6:
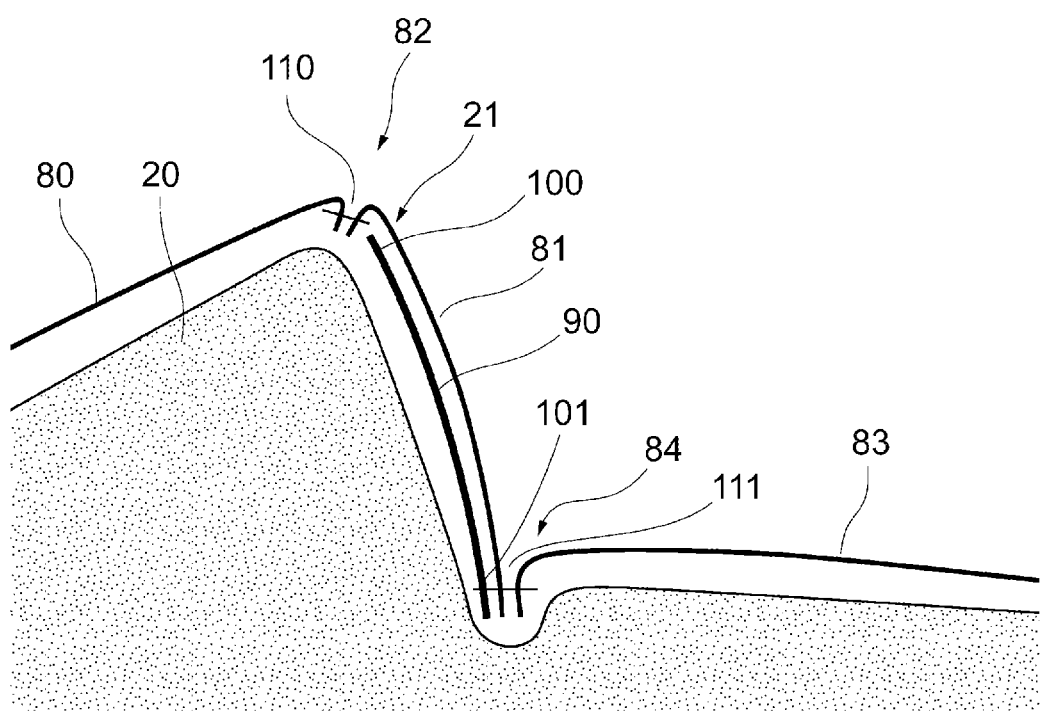
FIG. 6 is a schematic diagram showing a cross-sectional structure of the overhanging portion.

For example, as shown in FIG. 5, a protruded corner may be provided on an overhanging portion formed in a shoulder part of the backrest 11. In such case, the overhanging portion may include: a protruding corner 82 formed by joining a first surface 80 and a second surface 81; and a recessed corner 84 formed by joining the second surface 81 and a third surface 83, as shown in FIGS. 5 and 6. A contour defining plate 90 is attached to the back side of the surface cover 21 at a position corresponding to the second surface 81. The contour defining plate 90 has a first edge 100 arranged along a top portion 110 of the protruding corner 82 and a second edge 101 arranged along a bottom portion 111 of the recessed corner 84. The contour defining plate 90 is sewn with the surface cover 21 at the second edge 101, i.e., in the vicinity of the bottom portion 111 of the recessed corner 84 which is located apart from the top portion 110 of the protruding corner 82 and on the opposite side of the first edge 100. The contour defining plate 90 is not fixed to the surface cover 21 at the first edge 100 which is located on the side of the top portion 110 of the protruding corner 82.

Figure 7:
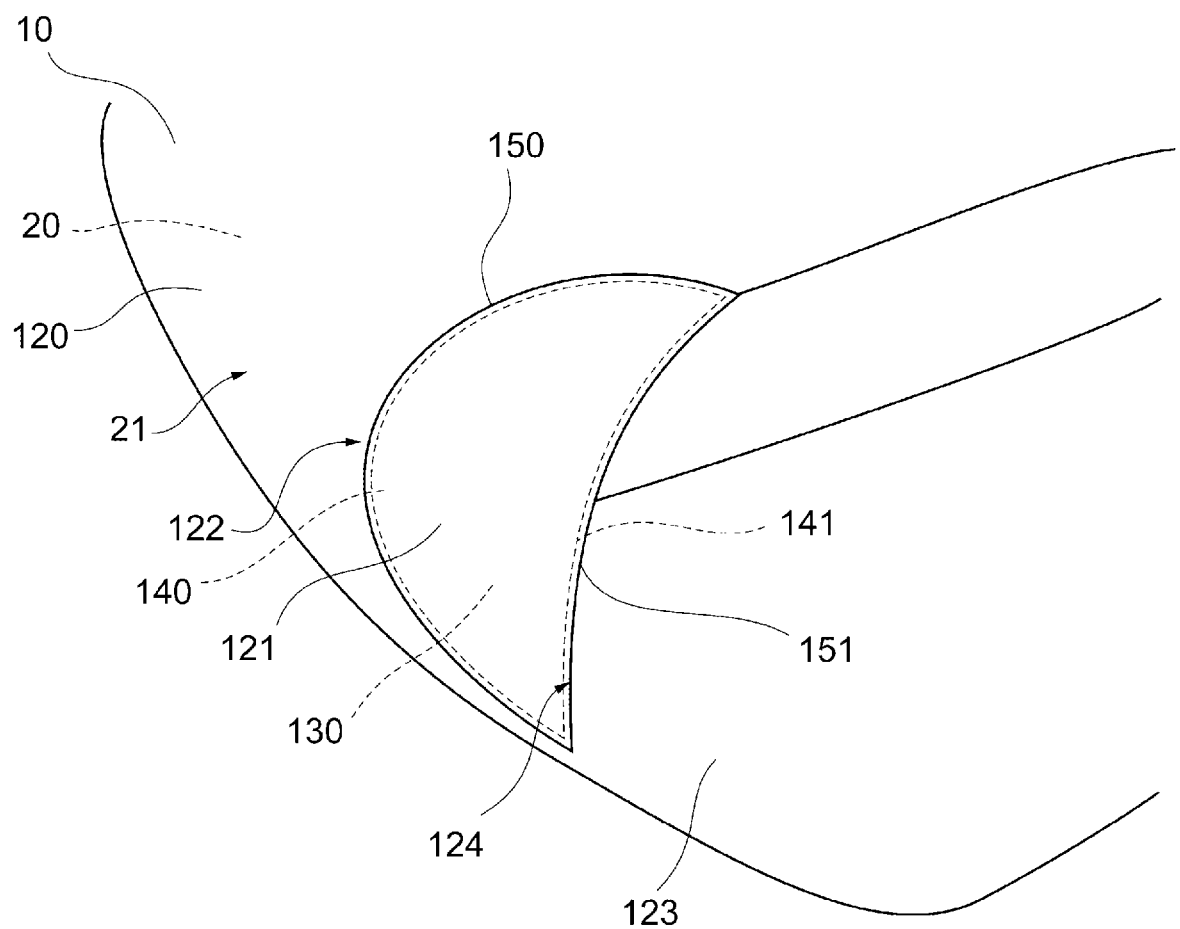
FIG. 7 is an illustration showing a protrusion in a front portion of a seat part.
Figure 8:
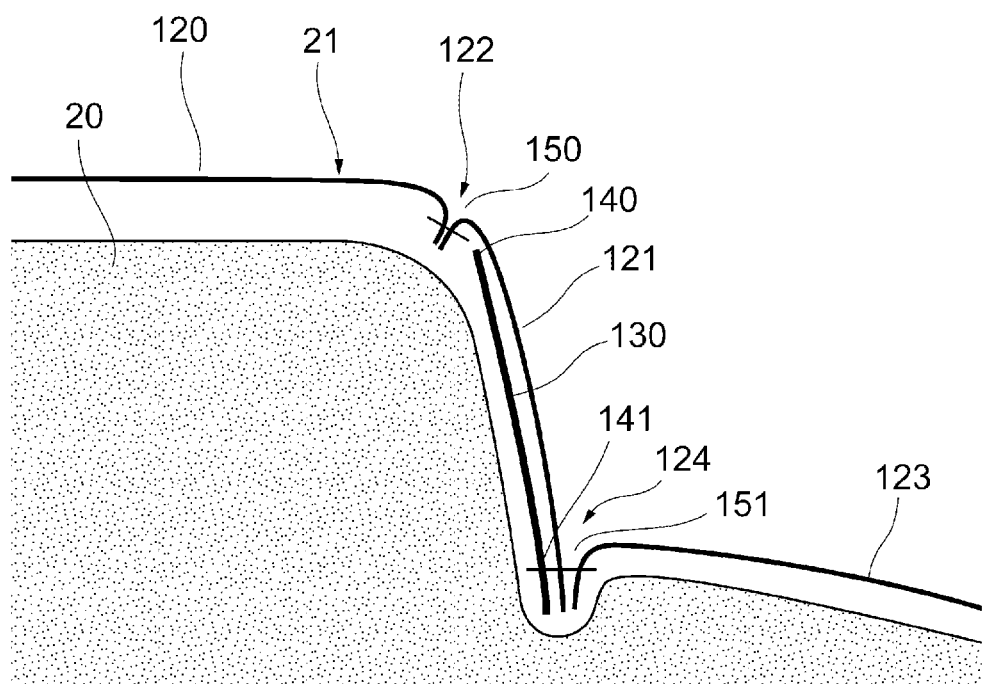
FIG. 8 is a schematic diagram showing a cross-sectional structure of the protrusion.

For example, as shown in FIG. 7, a protruded corner may be provided on a protrusion formed on a lateral surface of a front portion of the seat part 10. In such case, the protrusion may include, for example: a protruding corner 122 formed by joining a first surface 120 and a second surface 121; and a recessed corner 124 formed by joining the second surface 121 and a third surface 123, as shown in FIGS. 7 and 8. A contour defining plate 130 is attached to the back side of the surface cover 21 at a position corresponding to the second surface 121. The contour defining plate 130 has a first edge 140 arranged along a top portion 150 of the protruding corner 122 and a second edge 141 arranged along a bottom portion 151 of the recessed corner 124. The contour defining plate 130 is sewn with the surface cover 21 at the second edge 141, i.e., in the vicinity of the bottom portion 151 of the recessed corner 124 which is located apart from the top portion 150 of the protruding corner 122 and on the opposite side of the first edge 140. The contour defining plate 130 is not fixed to the surface cover 21 at the first edge 140 which is located on the side of the top portion 150 of the protruding corner 122.

Figure 9:
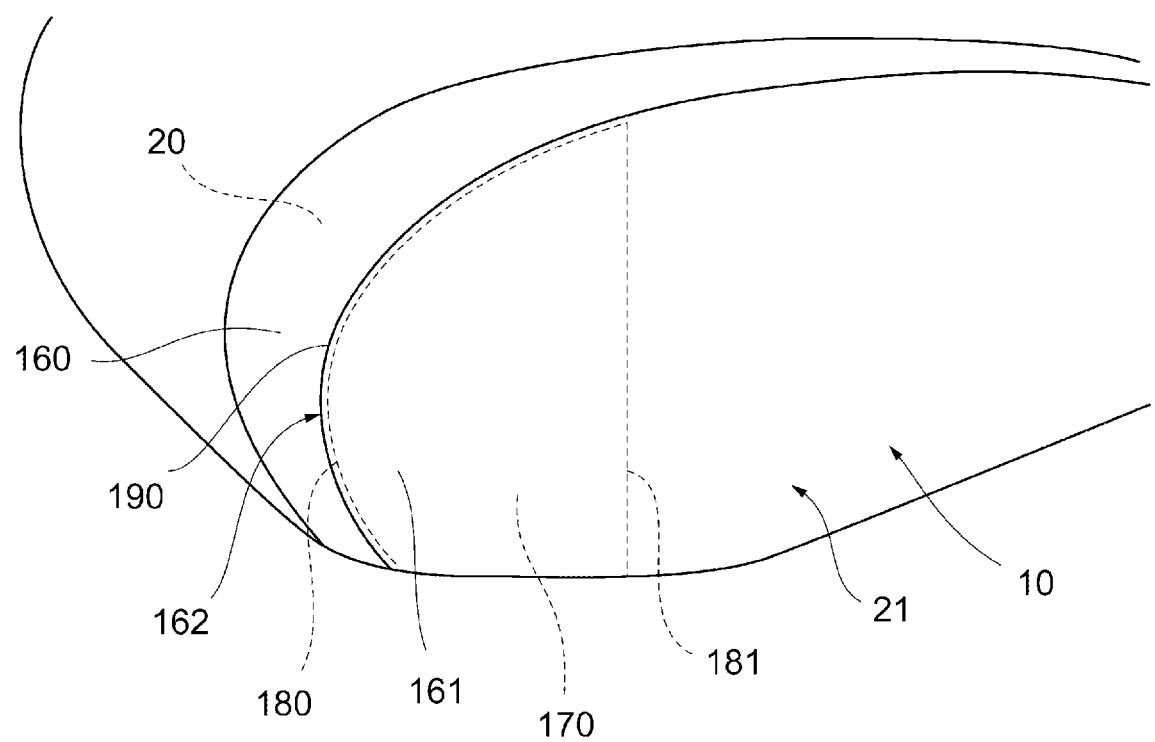
FIG. 9 is an illustration showing a front portion in a lateral surface of the seat part.
Figure 10:
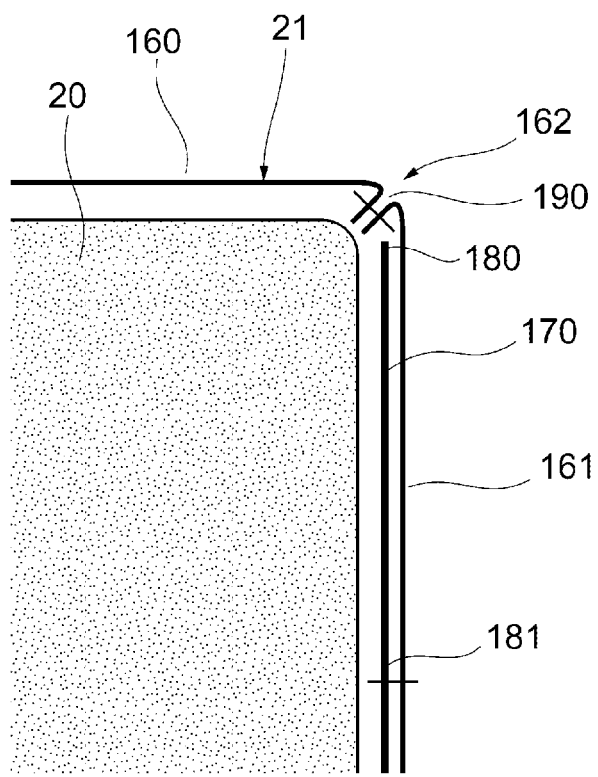
FIG. 10 is a schematic diagram showing a cross-sectional structure of the front portion in the lateral surface of the seat part.

For example, as shown in FIG. 9, a protruded corner may be provided on a front portion in a lateral surface of the seat part 10. In such case, the front portion may include, for example, a protruding corner 162 formed by joining a first surface 160 and a second surface 161, as in FIGS. 9 and 10. A contour defining plate 170 is attached to the back side of the surface cover 21 at a position corresponding to the second surface 161. The contour defining plate 170 has a first edge 180 arranged along an arcuate top portion 190 of the protruding corner 162 and a second edge 181 arranged at a position corresponding to the chord of the arcuate top portion 190. The contour defining plate 170 is sewn with the surface cover 21 at the second edge 181. The contour defining plate 170 is not fixed to the surface cover 21 at the first edge 180 which is located on the side of the top portion 190 of the protruding corner 162.

Although the preferred embodiments of the invention have been described above with reference to the attached drawings, the present invention is not limited to such examples. It is obvious that a person skilled in the art can conceive of various types of changes or modifications within the range of ideas to be set forth in the scope of the claims and it should be understood that such changes or modifications belong to the technical scope of the present invention as a matter of course.

For example, the position and the number of protruding corners in the vehicle seat are not limited to those indicated in the above embodiments. The shape of the contour defining plate provided in the protruding corner is also not limited to those indicated in the above embodiments. The means for fixing the contour defining plate to the surface cover does not have to be sewing, and any known means may be used.

According to the present invention, it is possible to provide a vehicle seat capable of achieving a desired three-dimensional shape having a protruding corner.

The present invention is suitable for use in providing a vehicle seat capable of achieving a desired three-dimensional shape having a protruding corner.

What is claimed is:

1. A vehicle seat, comprising:
a protruding corner formed by joining a first surface and a second surface, and
a recessed corner formed by joining the second surface and a third surface,
wherein the protruding corner includes:
a pad;
a surface cover covering a surface of the pad; and
a contour defining plate that is provided on a back side of the surface cover at a position corresponding to the second surface of the protruding corner, the contour defining plate defining a contour of the protruding corner,
wherein the contour defining plate has a first edge arranged along a top portion of the protruding corner and a second edge different from the first edge, the contour defining plate not being fixed to the surface cover at the first edge, but fixed to the surface cover at the second edge,
wherein the second edge of the contour defining plate is located apart from the top portion of the protruding corner and located on an opposite side of the first edge, and
wherein the second edge of the contour defining plate is arranged along a bottom portion of the recessed corner and fixed to the surface cover at the bottom portion of the recessed corner.

2. The vehicle seat according to claim 1, wherein the contour defining plate is made of resin and fixed by sewing to the surface cover.

3. The vehicle seat according to claim 1, wherein the protruding corner is provided on a lateral surface of a backrest of the vehicle seat.

* * * * *